US011573636B2

(12) United States Patent
Amin-Shahidi et al.

(10) Patent No.: US 11,573,636 B2
(45) Date of Patent: Feb. 7, 2023

(54) HAPTIC ACTUATOR INCLUDING PERMANENT MAGNET HAVING A NON-VERTICAL, MAGNETIC POLARIZATION TRANSITION ZONE AND RELATED METHODS

(71) Applicant: Apple Inc., Cupertino, CA (US)

(72) Inventors: Darya Amin-Shahidi, San Jose, CA (US); Denis G. Chen, Cupertino, CA (US); Alex M. Lee, Sunnyvale, CA (US); Scott D. Ridel, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 16/915,539

(22) Filed: Jun. 29, 2020

(65) Prior Publication Data
US 2021/0405753 A1 Dec. 30, 2021

(51) Int. Cl.
*G06F 3/01* (2006.01)
*H02K 33/18* (2006.01)
*H02K 33/16* (2006.01)

(52) U.S. Cl.
CPC ............. *G06F 3/016* (2013.01); *H02K 33/16* (2013.01); *H02K 33/18* (2013.01)

(58) Field of Classification Search
CPC ........ G06F 3/016; H02K 33/12; H02K 33/16; H02K 33/18; B06B 1/045
See application file for complete search history.

(56) References Cited

U.S. PATENT DOCUMENTS

| | | | |
|---|---|---|---|
| 5,170,104 A | 12/1992 | Laughlin | |
| 5,719,451 A | 2/1998 | Cook et al. | |
| 5,896,076 A * | 4/1999 | van Namen | H01F 7/1615 |
| | | | 335/229 |
| 7,218,018 B2 | 5/2007 | Hasegawa et al. | |
| 7,378,765 B2 | 5/2008 | Iwasa et al. | |
| 8,169,402 B2 | 5/2012 | Shahoian et al. | |
| 8,680,723 B2 | 3/2014 | Subramanian et al. | |
| 9,660,509 B2 | 5/2017 | Kim et al. | |
| 9,966,825 B2 | 5/2018 | Hajati et al. | |

(Continued)

FOREIGN PATENT DOCUMENTS

| | | | |
|---|---|---|---|
| EP | 3419151 B1 * | 8/2020 | ............ B26B 19/12 |
| WO | 2013169299 A1 | 11/2013 | |

(Continued)

OTHER PUBLICATIONS

Product Specification Sheet: Geeplus, VIBRO1 Vibration Actuator, 2 pages, www.geeplus.biz, downloaded on Jul. 15, 2015.

*Primary Examiner* — Toan N Pham
*Assistant Examiner* — Mancil Littlejohn, Jr.
(74) *Attorney, Agent, or Firm* — Brownstein Hyatt Farber Schreck, LLP

(57) ABSTRACT

A haptic actuator may include a housing, a stator coupled to a medial interior portion of the housing, and a field member within the housing and having an opening receiving the stator therein. The field member may include a frame, and at least one permanent magnet carried by the frame. The at least one permanent magnet may include side-by-side magnetic segments having alternating magnetic polarizations with at least one non-vertical magnetic polarization transition zone between adjacent magnetic segments.

23 Claims, 17 Drawing Sheets

(56) References Cited

U.S. PATENT DOCUMENTS

| | | | |
|---|---|---|---|
| 9,989,437 | B2 | 6/2018 | Umehara |
| 10,158,277 | B2 | 12/2018 | Chun |
| 10,348,176 | B2 | 7/2019 | Mao |
| 10,890,973 | B2 | 1/2021 | Hajati |
| 10,994,304 | B2 | 5/2021 | Takahashi et al. |
| 2004/0178684 | A1* | 9/2004 | Joong ................. H02K 41/031 310/12.24 |
| 2012/0169148 | A1* | 7/2012 | Kim ..................... H02K 33/16 310/25 |
| 2014/0197936 | A1 | 7/2014 | Biggs et al. |
| 2015/0109223 | A1* | 4/2015 | Kessler .............. G06F 3/03547 29/605 |
| 2015/0116205 | A1 | 4/2015 | Westerman et al. |
| 2015/0130730 | A1 | 5/2015 | Harley et al. |
| 2018/0236488 | A1 | 8/2018 | Miyazaki |
| 2018/0241293 | A1 | 8/2018 | Miyazki |
| 2020/0001326 | A1* | 1/2020 | Takahashi .............. H04M 1/02 |
| 2020/0052567 | A1 | 2/2020 | Yamada et al. |
| 2021/0099062 | A1* | 4/2021 | Tarelli ................. H01F 7/1638 |

FOREIGN PATENT DOCUMENTS

| | | | |
|---|---|---|---|
| WO | 2013169303 | A1 | 11/2013 |
| WO | 2013169305 | A1 | 11/2013 |
| WO | 2013170099 | A1 | 11/2013 |
| WO | 2013188307 | A2 | 12/2013 |
| WO | 2014018111 | A1 | 1/2014 |
| WO | 2015020663 | A1 | 2/2015 |

\* cited by examiner

US 11,573,636 B2

HAPTIC ACTUATOR INCLUDING PERMANENT MAGNET HAVING A NON-VERTICAL, MAGNETIC POLARIZATION TRANSITION ZONE AND RELATED METHODS

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A haptic actuator may include a housing, a stator coupled to a medial interior portion of the housing, and a field member within the housing and having an opening receiving the stator therein. The field member may include a frame, and at least one permanent magnet carried by the frame. The at least one permanent magnet may include a plurality of side-by-side magnetic segments having alternating magnetic polarizations with at least one non-vertical magnetic polarization transition zone between adjacent magnetic segments.

The at least one non-vertical magnetic polarization transition zone may have an angle of at least three degrees from normal to a surface of the at least one permanent magnet, for example. The plurality of side-by-side magnetic segments may have at least one vertical magnetic polarization transition zone between adjacent magnetic segments.

The at least one permanent magnet may include a first permanent magnet on a first side of the opening and a second permanent magnet on a second side of the opening opposite the first side of the opening. The plurality of side-by-side magnetic segments of the first permanent magnet may have opposite magnetic polarizations with respect to the plurality of side-by-side magnetic segments of the second permanent magnet, for example.

At least one of the plurality of side-by-side magnetic segments may have a trapezoidal shape, for example. The haptic actuator may also include at least one flexure coupled between an end of the frame and adjacent interior portions of the housing to permit reciprocal movement of the field member within the elongate housing responsive to the stator. The stator may include a core and a plurality of serially coupled coils surrounding the core, for example.

The core may have a plurality of openings therein to expose a plurality of cavities having a larger size than a corresponding opening. The plurality of serially coupled coils may be carried within the plurality of cavities, for example. At least one of the plurality of openings may be offset from a center of a corresponding one of the plurality of cavities. The stator may have at least one opening therein offset from an adjacent magnetic polarization transition zone between adjacent magnetic segments.

A method aspect is directed to a method of making a haptic actuator. The method may include mounting a stator to a medial interior portion of a housing. The method may also include mounting a field member, including a frame and at least one permanent magnet carried by the frame, within the housing so that the stator is received within an opening in the field member. The at least one permanent magnet may include a plurality of side-by-side magnetic segments having alternating magnetic polarizations with at least one non-vertical magnetic polarization transition zone between adjacent magnetic segments.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and numbers in increments of 100 are used to indicate similar elements in alternative embodiments.

Figure 1:
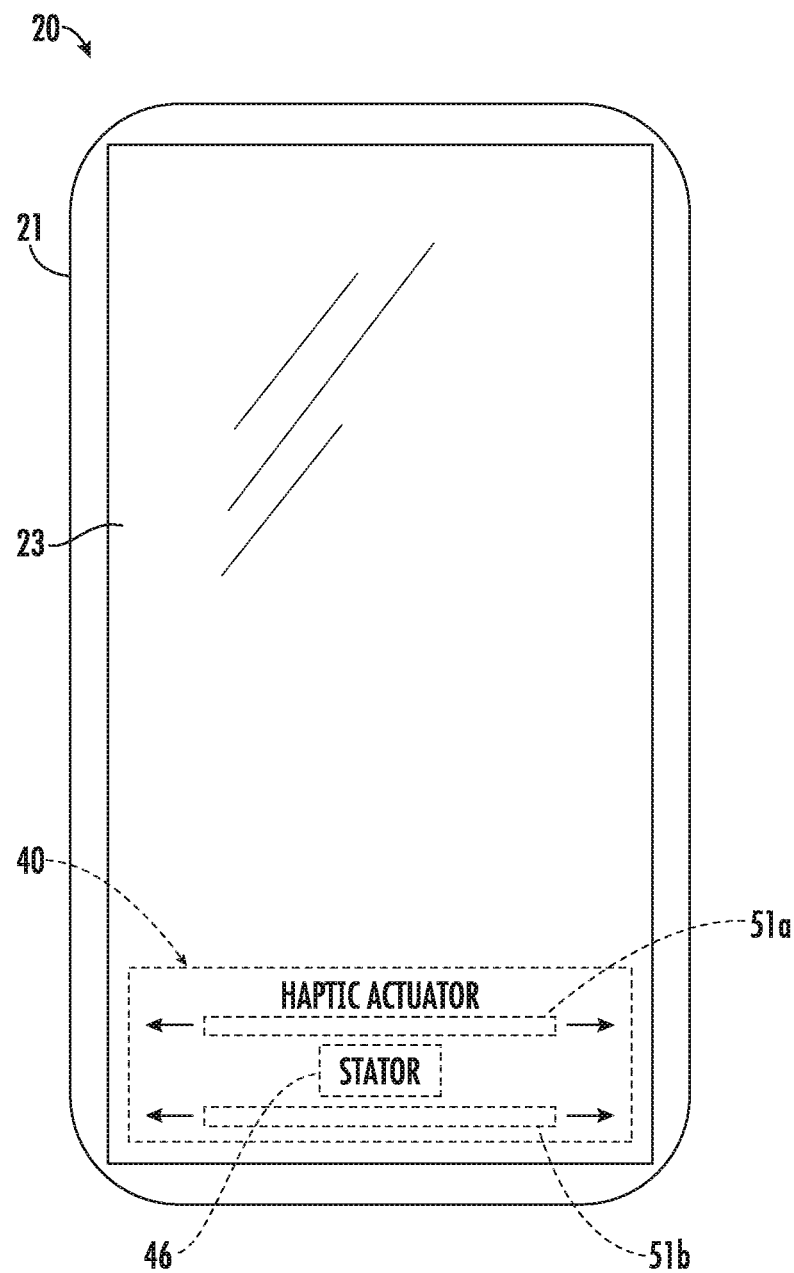
FIG. 1 is a schematic diagram of an electronic device including a haptic actuator in accordance with an embodiment.
Figure 2:
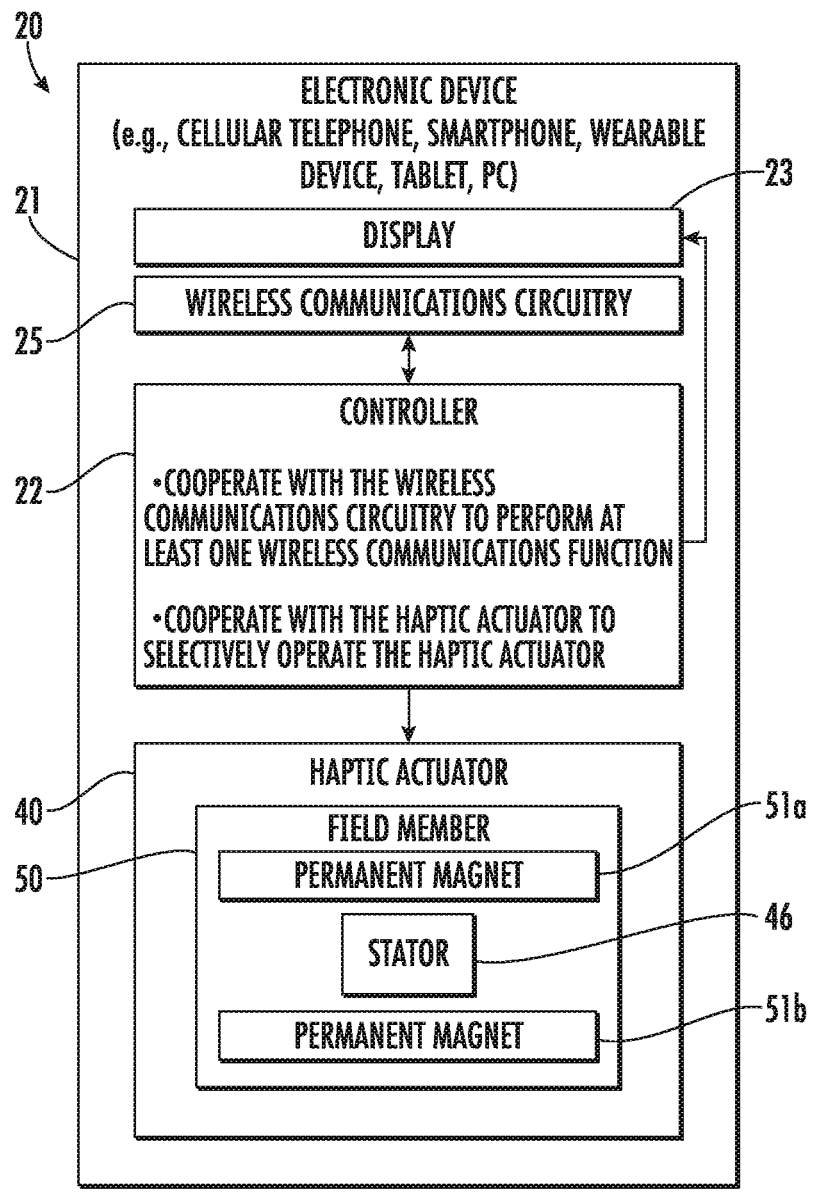
FIG. 2 is a schematic block diagram of the electronic device of FIG. 1.

Referring initially to FIGS. 1-2, an electronic device 20 illustratively includes a device housing 21 and a controller 22 carried by the device housing. The electronic device 20 is illustratively a mobile wireless communications device, for example, a cellular telephone or smartphone. The electronic device 20 may be another type of electronic device, for example, a wearable device (e.g., a watch), a tablet computer, a laptop computer, etc.

Wireless communications circuitry 25 (e.g. cellular, WLAN, Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be, for example, a light emitting diode (LED) display, a liquid crystal display (LCD), or may be another type of display, as will be appreciated by those skilled in the art. The display 23 may be a touch display and may cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback to the user in the form of relatively long and/or short vibrations. The vibrations may be indicative of a message received, and the duration and type of the vibration may be indicative of the type of message received. Of course, the vibrations may be indicative of or convey other types of information.

While a controller 22 is described, it should be understood that the controller 22 may include one or more of a processor and other circuitry to perform the functions described herein. For example, the controller 22 may include a class-D amplifier to drive the haptic actuator 40 and/or sensors for sensing voltage and current.

Figure 3:
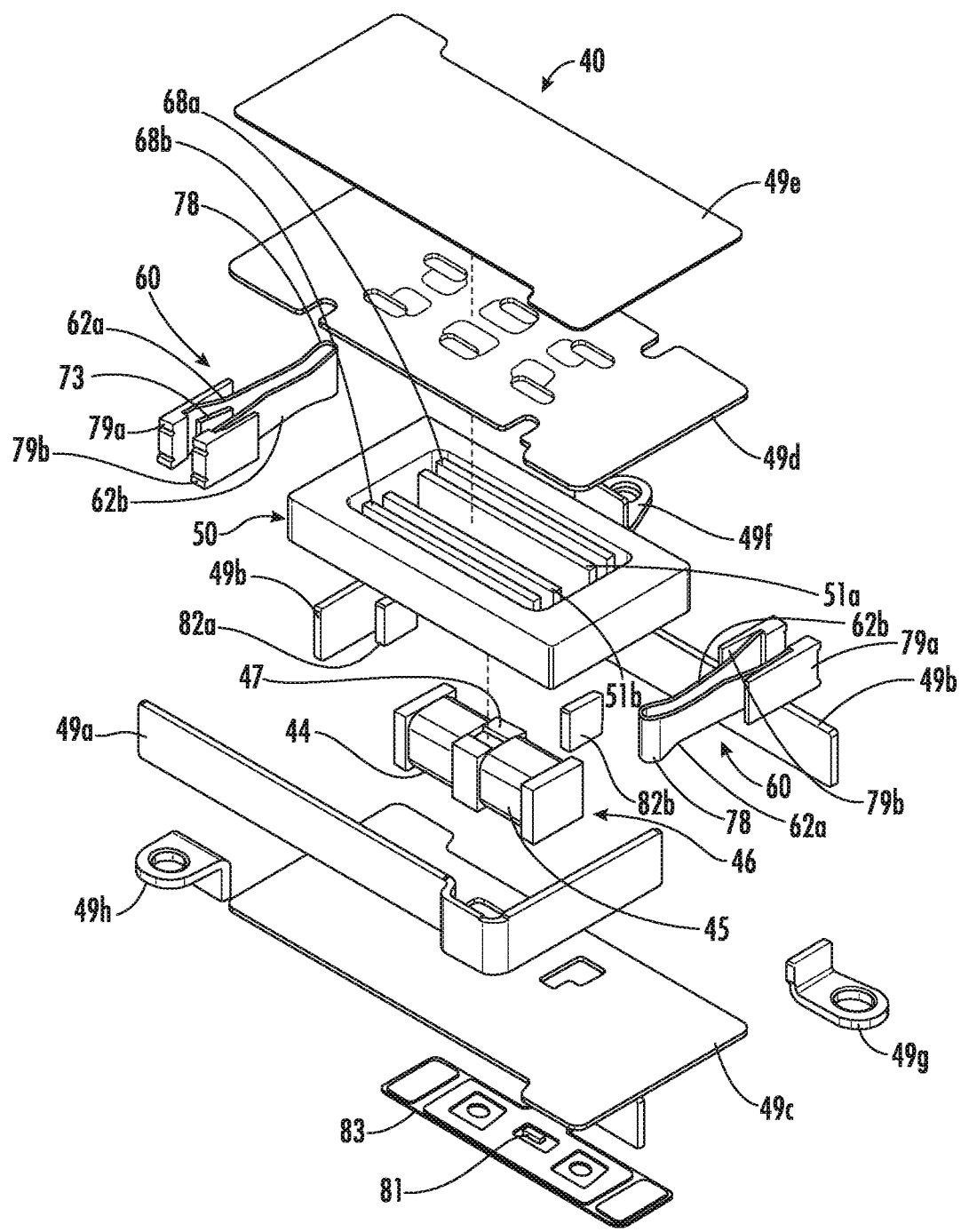
FIG. 3 is an exploded view of a haptic actuator in accordance with an embodiment.
Figure 4:
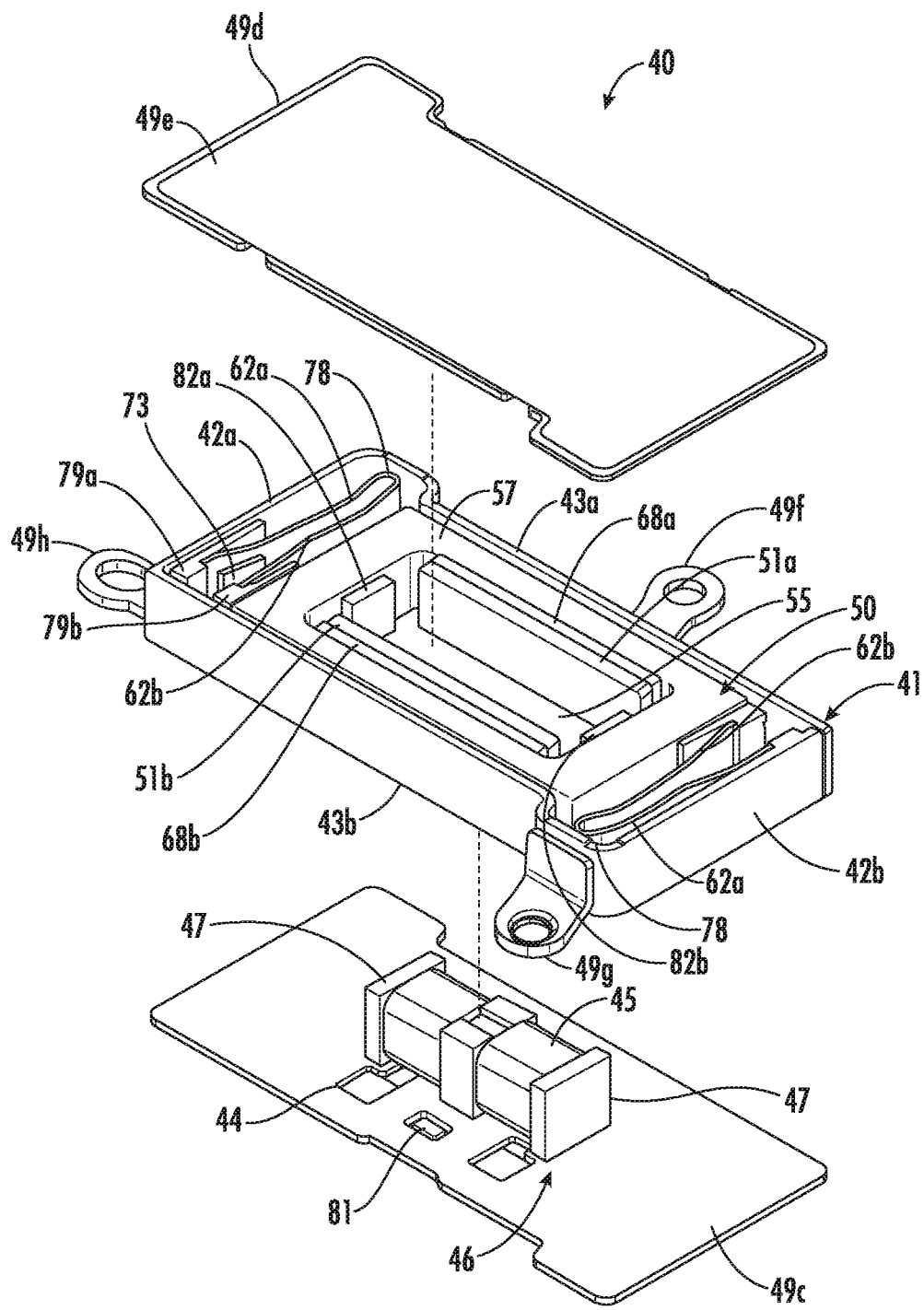
FIG. 4 is a partially exploded view of the haptic actuator of FIG. 3.
Figure 5:
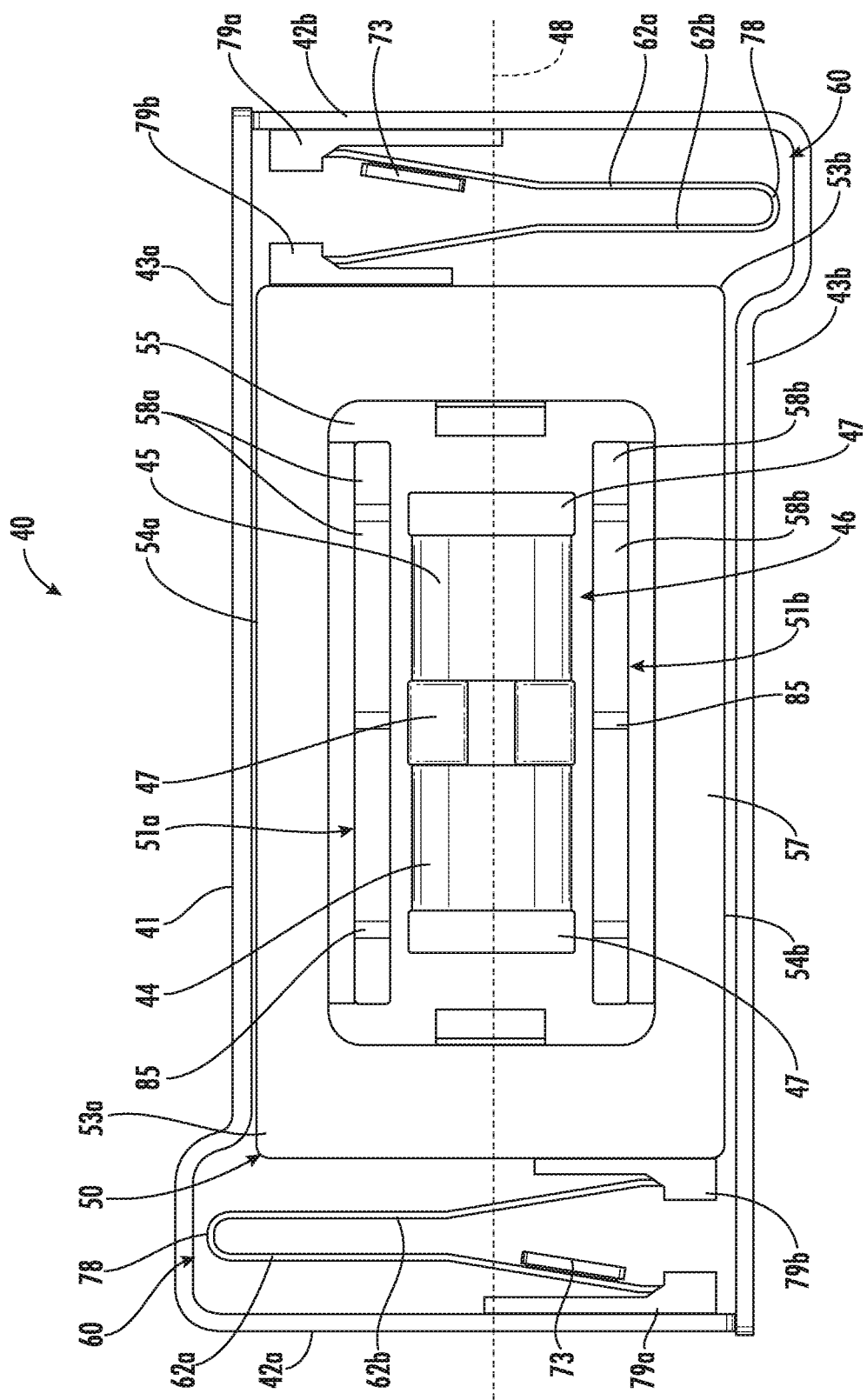
FIG. 5 is a top schematic view of a haptic actuator in accordance with an embodiment.

Referring now additionally to FIGS. 3-5 the haptic actuator 40 includes a housing, for example, an elongate housing 41 that defines a lengthwise axis 48 (FIG. 5). The elongate housing 41 may be metal, for example, stainless steel or other non-ferritic material. The elongate housing 41 may be another type of material or include more than one type of material. The elongate housing 41 has opposing ends 42a, 42b and opposing sides 43a, 43b. The elongate housing 41 illustratively has a dimension in a length direction greater than a width direction (e.g., x-axis travel direction). The elongate housing 41 illustratively includes frame segments 49a, 49b defining sides (e.g., having an L-shape), a bottom plate 49c, and a cover 49d. A label cover 49e may also be carried by the cover 49d of the elongate housing 41. Brackets 49f-49h, for example, for mounting, are coupled to the frame segments 49a, 49b. Of course, the elongate housing 41 may include other and/or additional components may be formed as a monolithic unit. While an elongate housing 41 is described, it should be appreciated by those skilled in the art that the actuator housing may be another shape, for example, square.

The haptic actuator 40 also includes a stator 46 coupled to a medial interior portion of the elongate housing 41. The stator 46 illustratively includes a core 47 and serially coupled coils 44, 45 surrounding the core. While two serially coupled coils 44, 45 are illustrated, it will be appreciated by those skilled in the art that there may be any number of coils, for example, one or more than two, and the coils may be coupled in parallel and/or serially.

The haptic actuator 40 also includes a field member 50 within the elongate housing 41. The field member 50, similarly to the elongate housing 41, has opposing ends 53a, 53b and opposing sides 54a, 54b extending therebetween (FIG. 5). The field member 50, similarly to the elongate housing 41, has a dimension in a length direction greater than a width direction. Thus, the field member 50 is reciprocally movable in the length direction (i.e., the x-axis direction). While the movement of the field member 50 is described as being moveable in one direction, i.e., a linear haptic actuator, it should be understood that in some embodiments, the field member may be movable in other directions, i.e., an angular haptic actuator, or may be a combination of both a linear and an angular haptic actuator.

The field member 50 includes a frame 57. The frame 57 may define a mass or moveable mass, for example. The frame 57 may include tungsten, for example. The frame 57 may be a different material (e.g., relatively heavy material). In some embodiments, the field member 50 may include discrete masses instead of the frame 57 defining a mass.

The field member 50, and more particularly, the frame 57 has an opening 55 therein. The stator 46 is received within the opening 55.

The field member 50 also includes permanent magnets 51a, 51b carried by the frame 57. The permanent magnets 51a, 51b may be neodymium, for example. The permanent magnets 51a, 51b are illustratively elongate, similar to the elongate housing 41. More particularly, a first permanent magnet 51a is carried within the opening 55 on a first side of the opening, and a second permanent magnet 51b is carried within the opening on a second side of the opening.

Figure 6:
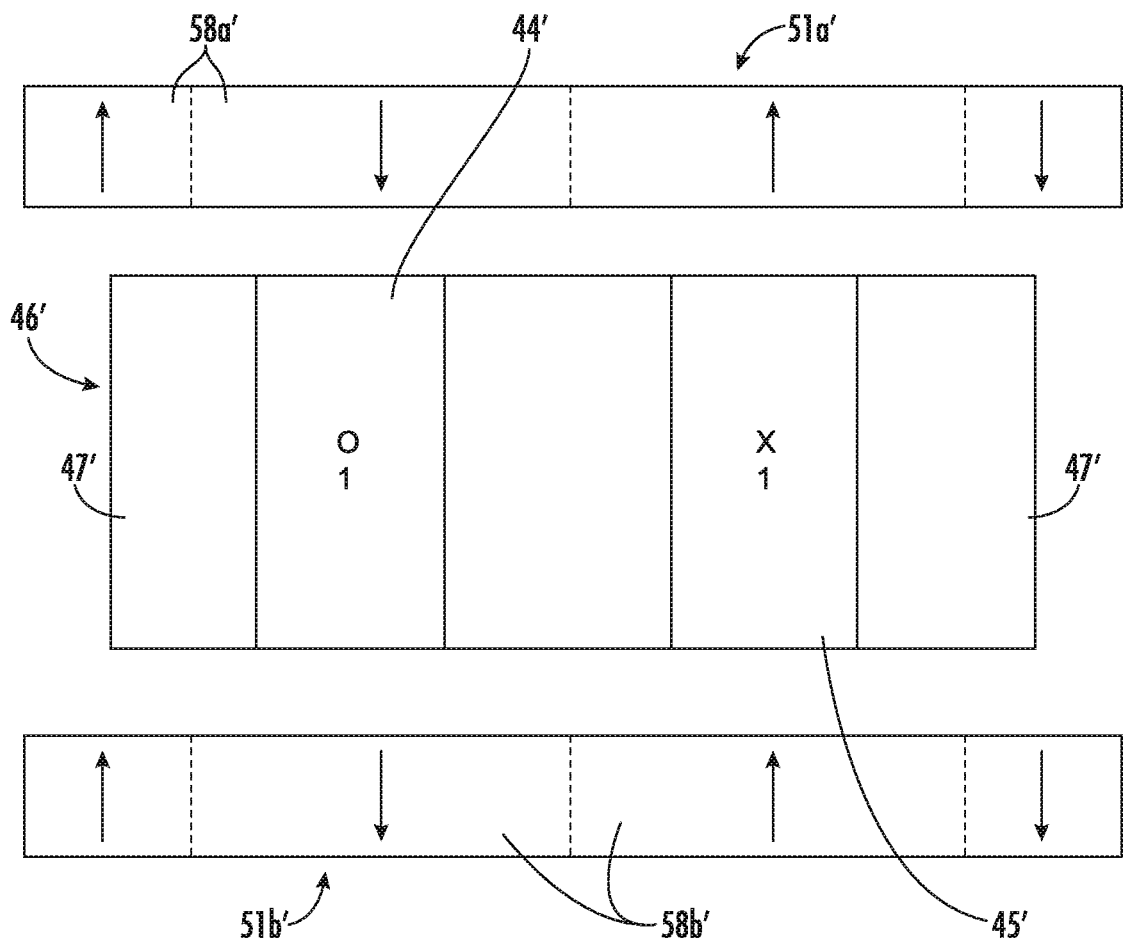
FIG. 6 is a schematic diagram of an exemplary magnetic pole orientation of permanent magnets of a haptic actuator in accordance with another embodiment.

Referring additionally to FIG. 6, in an embodiment, the first permanent magnet 51a' defines first alternating magnetic poles 58a'. The second permanent magnet 51b' defines second alternating magnetic poles 58b' that are oriented in alignment with the first plurality of alternating magnetic poles. A transition zone 85 may be between adjacent alternating magnetic poles 58a, 58b (FIG. 5). The permanent magnets 51a', 51b' may positioned in different directions with respect to their respective poles, for example. The present embodiment includes a single coil where current flows out of the page O1 with respect to a first half of the single coil 44' or first half of the coil loop, while current flows into the page X1 with respect to the second half of the single coil 45' or the second half of the coil loop (FIG. 6).

Figure 7:
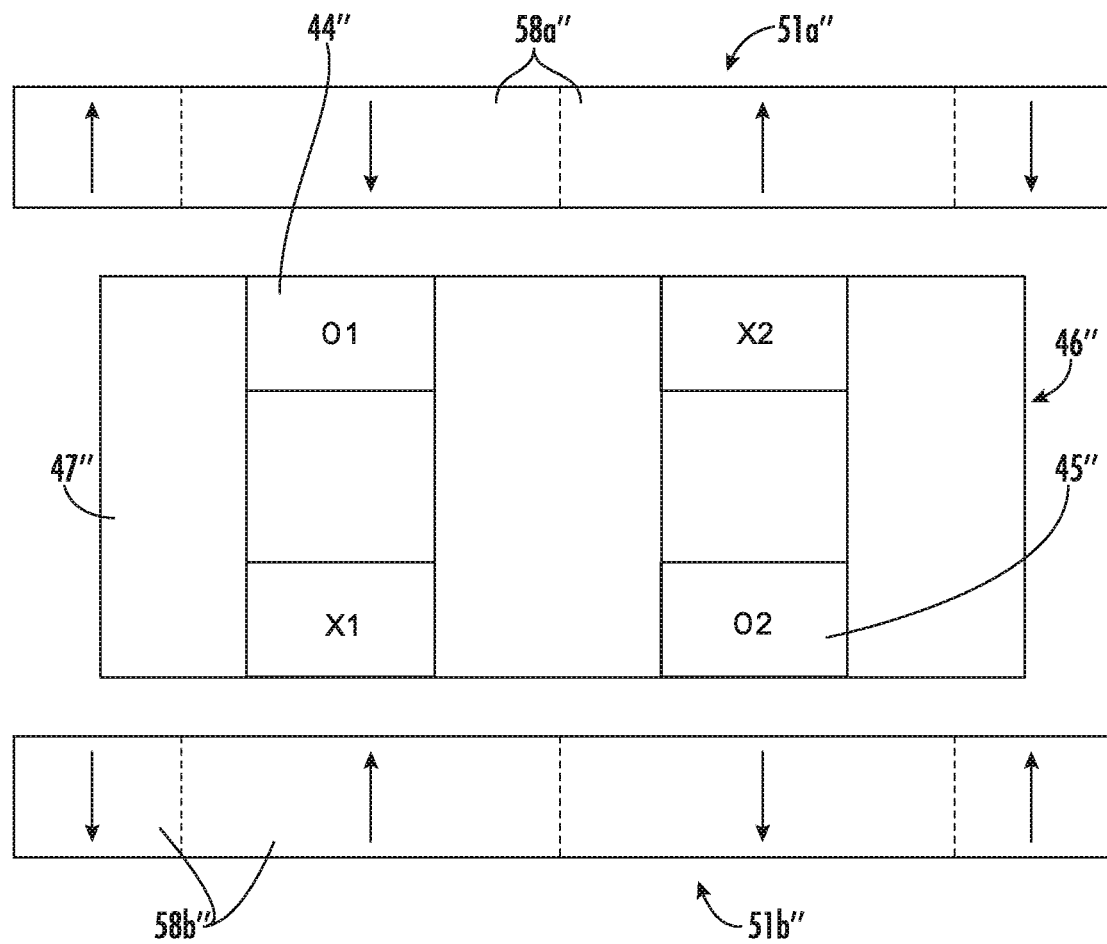
FIG. 7 is a schematic diagram of an exemplary magnetic pole orientation of permanent magnets of a haptic actuator in accordance with another embodiment.

Referring briefly to FIG. 7, in another embodiment the magnetic poles 58a", 58b" of the first and second permanent magnets 51a", 51b" are oriented in opposite directions. Illustratively, current flows out of the page O1 adjacent the first permanent magnet 51a" and into the page X1 adjacent the second permanent magnet 51b" as it relates to the first coil 44". Current flows into the page X2 adjacent the first permanent magnet 51a" and out of the page O2 adjacent the second permanent magnet 51b" as it relates to the second coil 45".

Figure 8:
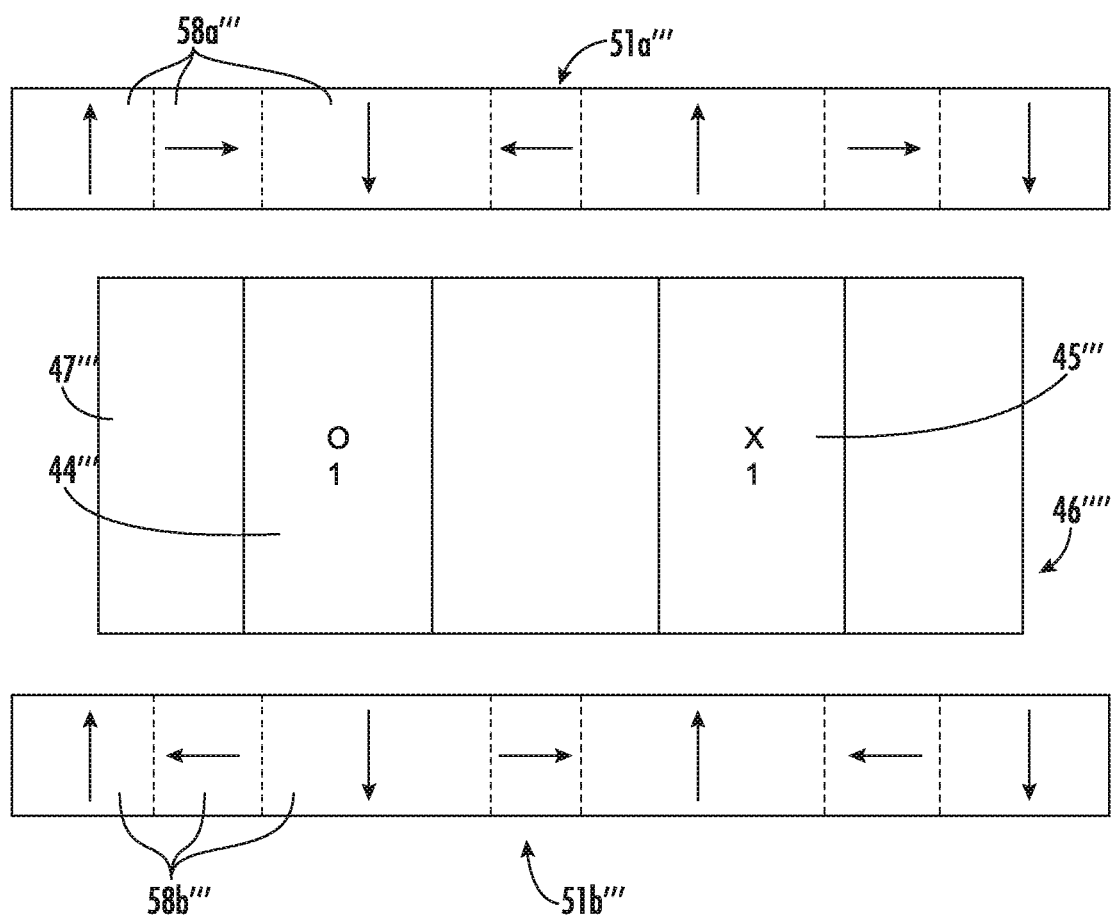
FIG. 8 is a schematic diagram of an exemplary magnetic pole orientation of permanent magnets of a haptic actuator in accordance with another embodiment.
Figure 9:
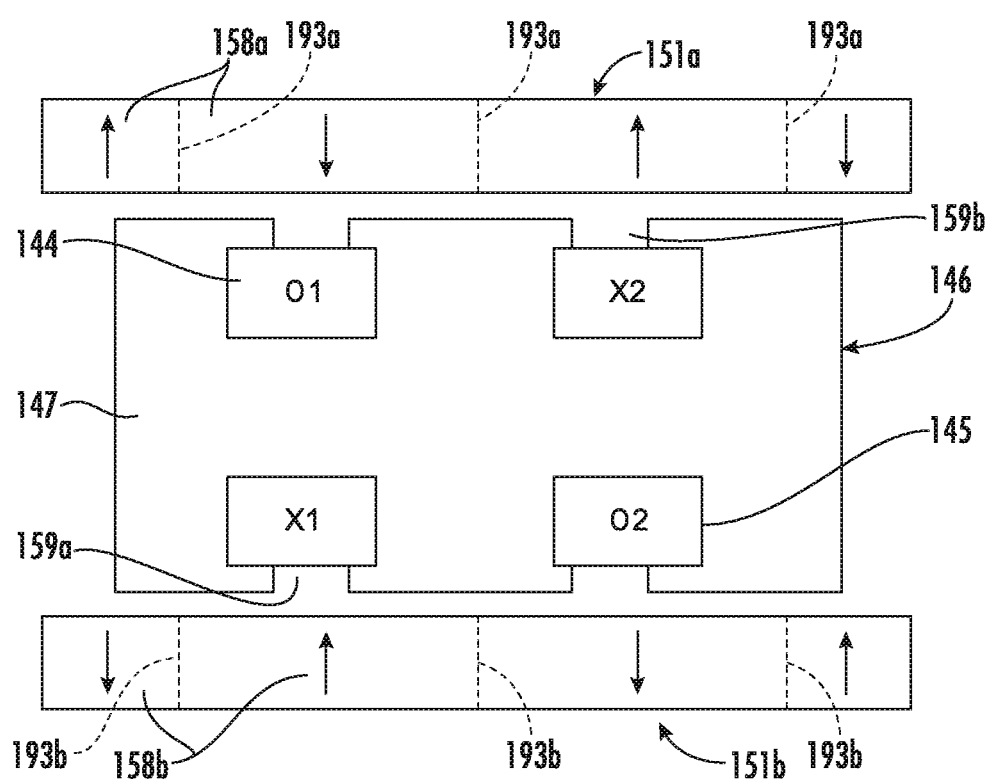
FIG. 9 is a schematic diagram of an exemplary coil positioning relative to the core in accordance with an embodiment.

Referring now to FIG. 8, in another embodiment, the magnetic poles 58a''', 58b''' of the first and second magnets 51a''', 51b''' are arranged in a Halbach array. The present embodiment includes a single coil where current flows out of the page O1 with respect to a first half of the single coil 44''' or first half of the coil loop, while current flows into the page X1 with respect to the second half of the single coil 45''' or the second half of the coil loop.

Referring again to FIGS. 3-5, a respective ferritic body 68a, 68b is between the permanent magnets 51a, 51b and the frame 57. In some embodiments, ferritic bodies 68a, 68b may not be used.

A Hall effect sensor 81 is also illustratively carried by the elongate housing 41. The Hall effect sensor 81 is carried by a flexible circuit substrate 83 that is coupled to a bottom of the elongate housing 41. The Hall effect sensor 81 senses a position of the field member 50 such that the controller 22 may drive the haptic actuator 40 based upon the sensed positon of the field member, as will be appreciated by those skilled in the art. Other and/or additional sensors or sensor types and techniques may be used to determine a location or position of the field member 50. In some embodiments, no Hall effect sensor 81 or other sensor for sensing of the position of the field member 50 may be used. Of course, other and/or additional sensors, such as, for example, motion sensors and strain sensors, may be used as a basis for driving the haptic actuator 40.

Respective first and second resilient stop members 82a, 82b are carried by the frame 57 within the opening 55. More particularly, the first and second resilient stop members 82a, 82b are carried within the opening 55 on first and second ends of the opening adjacent the longitudinal ends of the stator 46. The first and second resilient stop members 82a, 82b may define crash stops for the field member 50, for example. In some embodiments, the first and second resilient stop members 82a, 82b may be coupled to the stator 46.

The first and second resilient stop members 82a, 82b may include thermoplastic, for example, and may be coupled within the opening 55 on the first and second ends by way of pressure sensitive adhesive. In other embodiments, the first and second resilient stop members 82a, 82b may include other and/or additional materials and may be coupled to the frame 57 within the opening 55 using other techniques. In some embodiments, first and second resilient stop members 82a, 82b may not be used and/or any number of stop members may be used.

The haptic actuator 40 also includes respective flexures 60 coupling each of first and second ends 53a, 53b of the field member 50 to be reciprocally movable within the elongate housing 41. More particularly, the flexures 60 are each coupled between an end of the frame 57 and an adjacent interior portion (i.e., ends 42a, 42b of the elongate housing 41) to permit reciprocal movement of the field member 50 along the lengthwise axis 48 within the elongate housing responsive to the stator 46.

Each flexure 60 illustratively has a wishbone or Y-shape, with two diverging arms 62a, 62b joined together at proximal ends. The two diverging arms 62a, 62b have spaced distal ends operatively coupled between adjacent portions of the field member 50 and the elongate housing 41.

A bend 78 joins together the two diverging arms 62a, 62b at the proximal ends. The bend 78 causes the two diverging arms 62a, 62b to be spaced apart at the distal ends. While an example flexure 60 is illustrated, each flexure may have a different shape and more than one flexure may be used. For example, as will be appreciated by those skilled in the art, the haptic actuator 40, and more particularly, the geometry of each flexure 60 may satisfy desired stress and stiffness metrics relative to other flexure geometries, particularly under a relatively confined space under a specified amplitude of travel displacement for haptic applications.

A mechanical stop 73 is carried by the distal end of one of the diverging arms 62a. The mechanical stop 73 may include an elastomeric material, for example. The mechanical stop 73 may be carried by the other diverging arm 62b.

Anchor members 79a, 79b are illustratively coupled between each flexure 60 and the adjacent end 42a, 42b of the elongate housing 41 and each flexure and an adjacent end 53a, 53b of the field member 50, respectively. More particularly, the anchor members 79a, 79b are coupled between a distal end of an arm 62a and the end 42a, 42b of the elongate housing 41, and a distal end of another arm 62b and the end 53a, 53b of the field member 50.

A method aspect is directed to a method of making a haptic actuator 40. The method includes mounting a stator 46 to a medial interior portion of a housing 41. The method also includes mounting a field member 50, including a frame 57 and at least one permanent magnet 51a, 51b carried by the frame, within the housing 41 using at least one flexure 60 so that the stator 46 is received within an opening 55 in the field member 50 to permit reciprocal movement of the field member, for example along the lengthwise axis 48 within the housing responsive to the stator 46.

Referring now to FIGS. 9-12, in other embodiments, the actuator may include flared or flanged magnetic pole tips going over the coils. This may provide improved force characteristics, for example, by exhibiting a more linear behavior. Illustratively, the coils 144, 145 are wound around the core 147, and more particularly within cavities or recesses within the core so that a portion of the coils are exposed through openings 159a, 159b in the core. The first opening 159a is centered relative to the corresponding cavity, and the first coil 144 is carried with the corresponding cavity. The second opening 159b is laterally offset relative to the corresponding cavity toward an adjacent end of the core 147. The second coil 145 is carried within the corresponding cavity. The position of the cavities or recesses and openings 159a, 159b, for example, relative to transition zones 193a, 193b of the permanent magnets 151a, 151b (i.e., areas between adjacent different polarities) defines force curves or alters the performance or force characteristics of the field member, and more particularly, how the stator 146 "appears" to the permanent magnets 151a, 151b. In other words, by controlling the offset between the first and second openings 159a, 159b and the transition zones 193a, 193b of the permanent magnets 151a, 151b, desired force characteristics may be achieved.

Similar to embodiments described above, the magnetic poles 158a, 158b of the first and second permanent magnets 151a, 151b are oriented in opposite directions, and current flows out of the page O1 adjacent the first permanent magnet and into the page X1 adjacent the second permanent magnet as it relates to the first coil 144. Current flows into the page X2 adjacent the first permanent magnet 151a and out of the page O2 adjacent the second permanent magnet 151b as it relates to the second coil 145.

Figure 10:
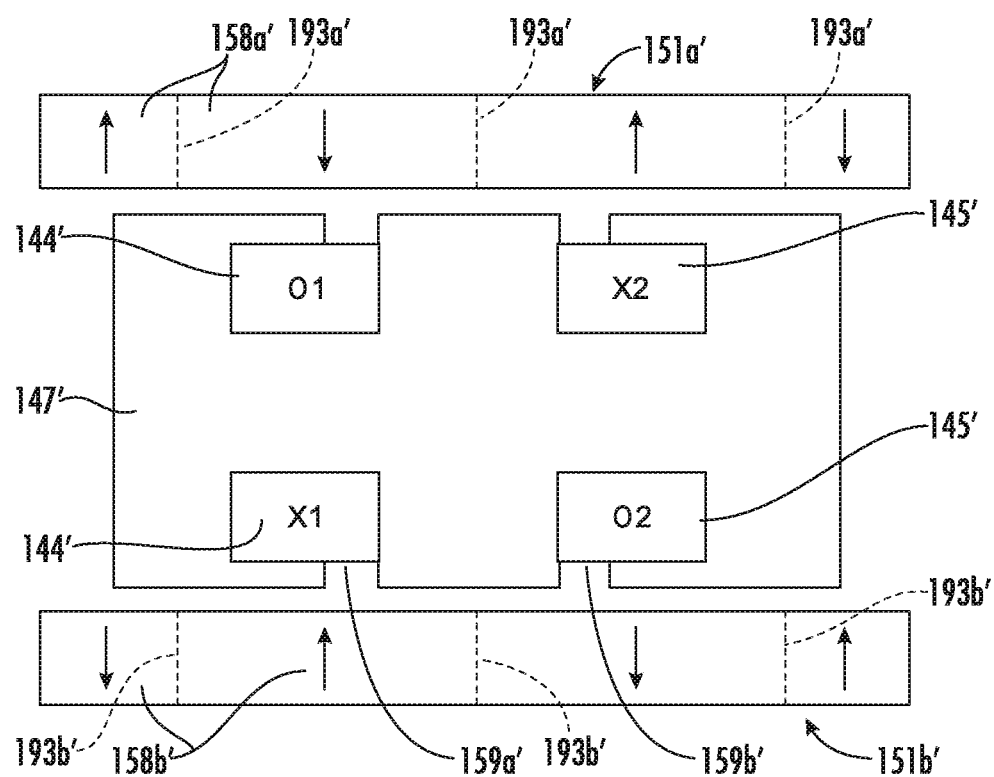
FIG. 10 is another schematic diagram of an exemplary coil positioning relative to the core in accordance with an embodiment.

As illustrated in FIG. 10, for example, the less of the coils 144', 145' that are exposed (i.e., the more of the coils that are within the cavity), the less of a jump there may be between magnetic poles 158a', 158b'. In other words, there may be less resistance to moving the field member because to the permanent magnets 151a', 151b' the core 147' and coils 144', 145' appear as one piece of material, and thus less ripples are generated during operation.

Figure 11:
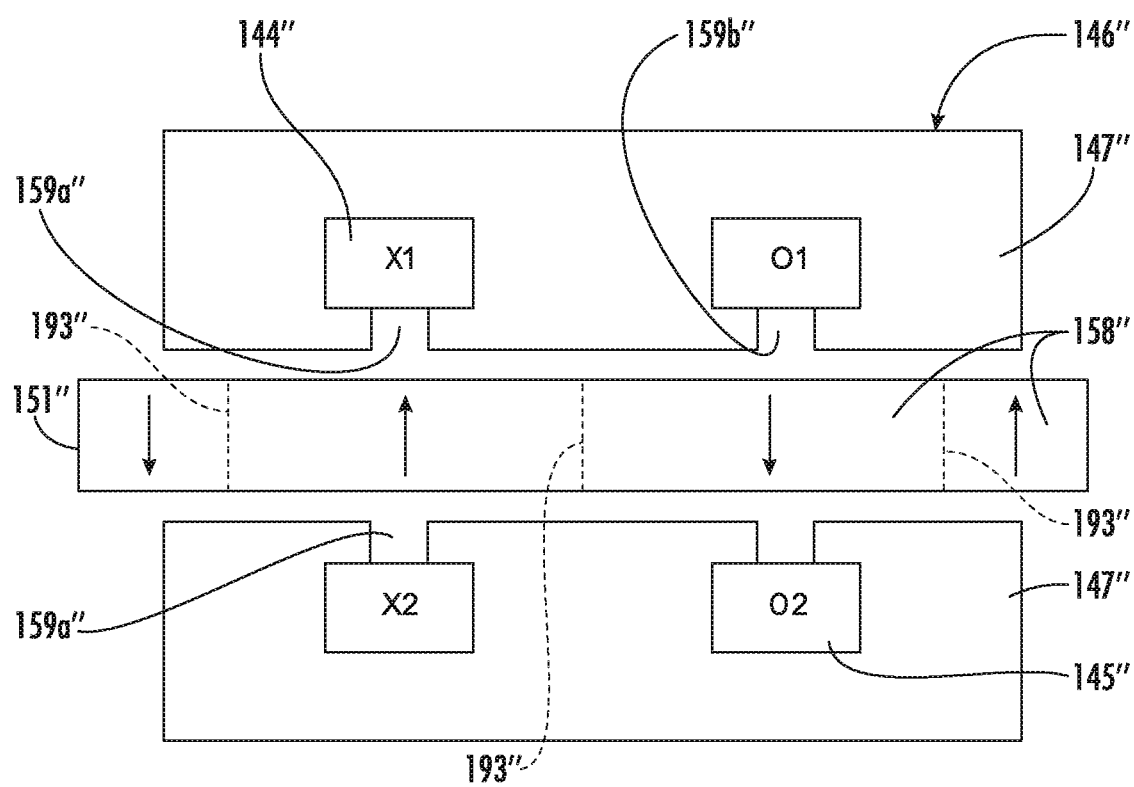
FIG. 11 is another schematic diagram of an exemplary magnet transition zone positioning relative to the core recess in accordance with an embodiment.
Figure 12:
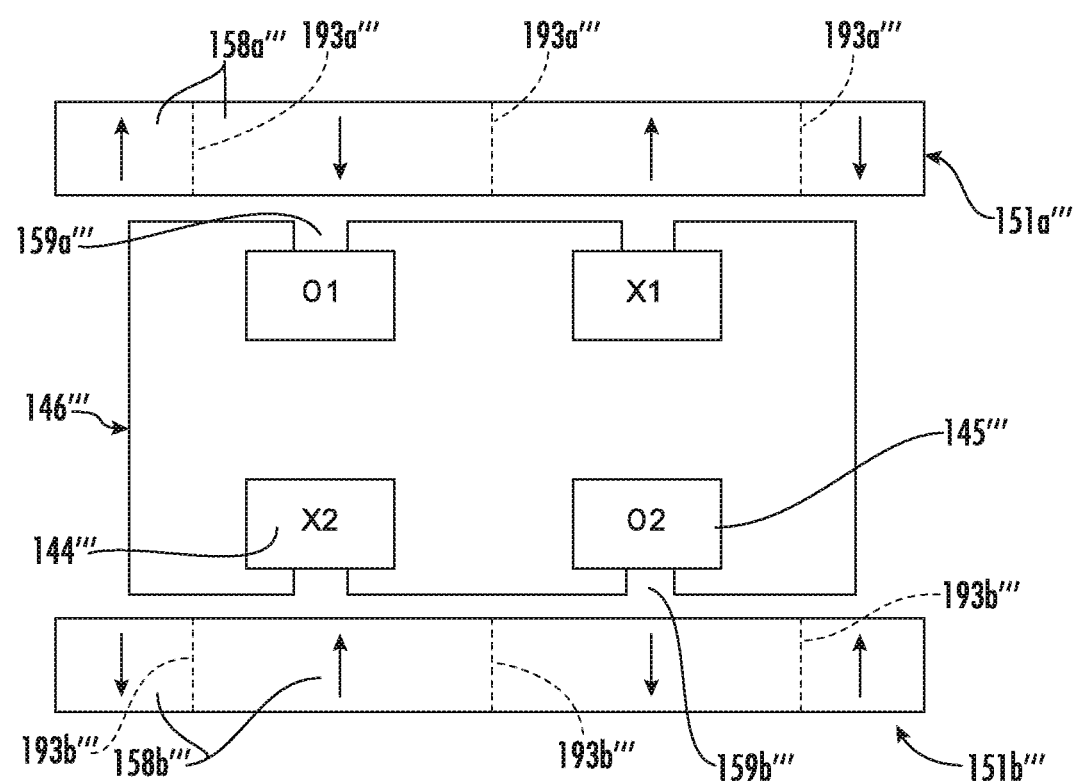
FIG. 12 is another diagram of an exemplary magnet transition zone positioning relative to the core recess in accordance with an embodiment.

Other arrangements with respect to the positioning of the coils are illustrated in FIGS. 11 and 12 to achieve desired operational characteristics. For example, a single permanent magnet 151" may pass through the stator 146", and more particularly, the coils 144", 145" (FIG. 11). In another embodiment, the first opening 159a'" in the core 147'" is centered relative to its corresponding recess within the core. In contrast to the first opening 159a'", the second opening 159b'" in the core 147'" is "offset" relative to its corresponding recess within the core. Elements illustrated, but not specifically described are similar to those described above.

As will be appreciated by those skilled in the art, the flanged arrangements in FIGS. 9-12 may reduce the pole-to-pole distance, which may in turn reduce cogging forces (i.e., a passive force generated based upon interaction between the magnet and the core) and improve overall force characteristics. Additionally, the flanged poles described above may be formed by way of metal injection. Of course, the flanged poles may be fabricated using other techniques or methods, for example, flanges may be added by attaching a secondary piece to the stator post coil winding. Still further, the pole-to-pole transition voids may be offset, for example, symmetrically, to achieve desired performance characteristics. The pole-to-pole transition voids may be non-vertical or curved, for example.

Figure 13:
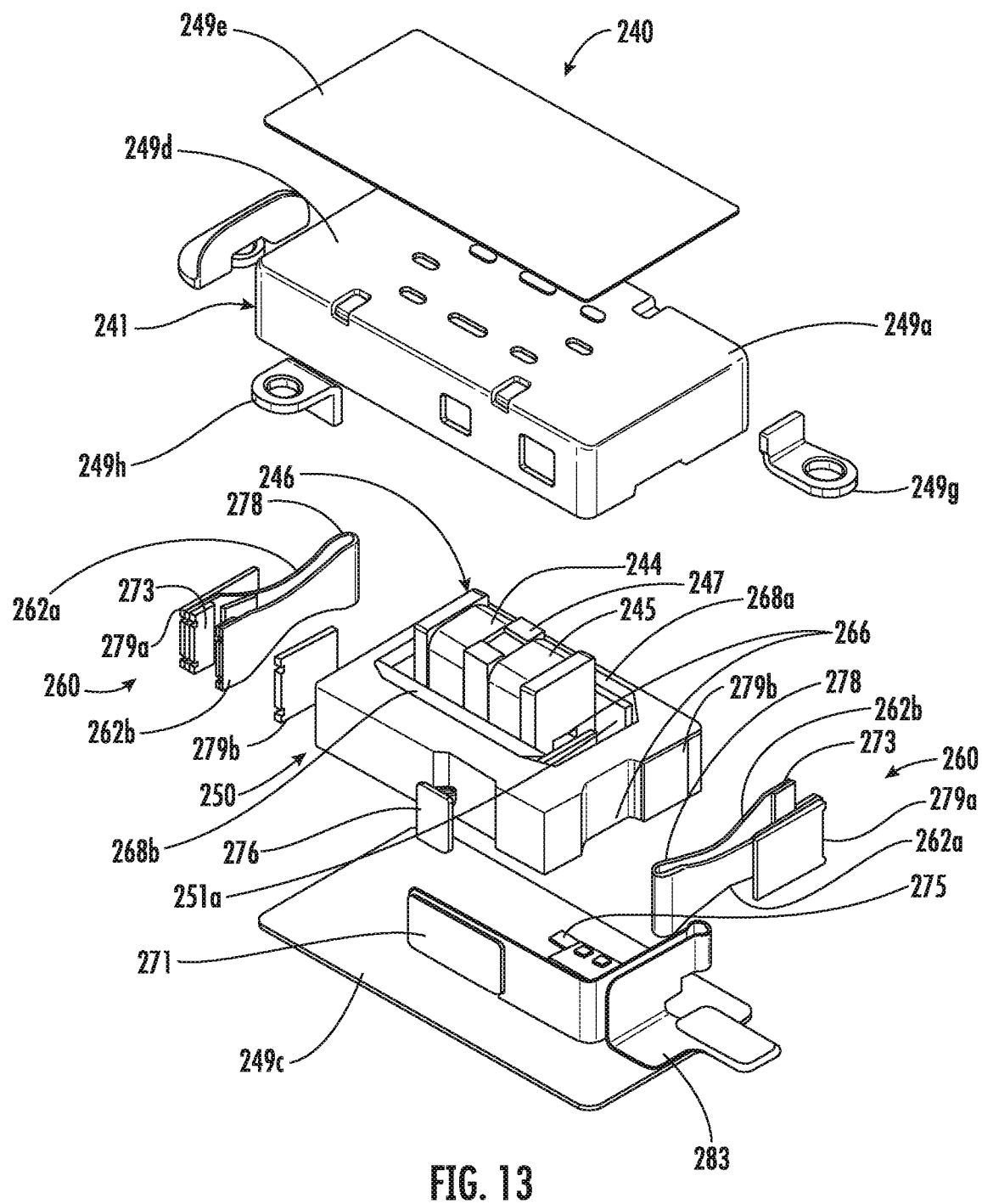
FIG. 13 is a partially exploded view of a haptic actuator in accordance with an embodiment.
Figure 14:
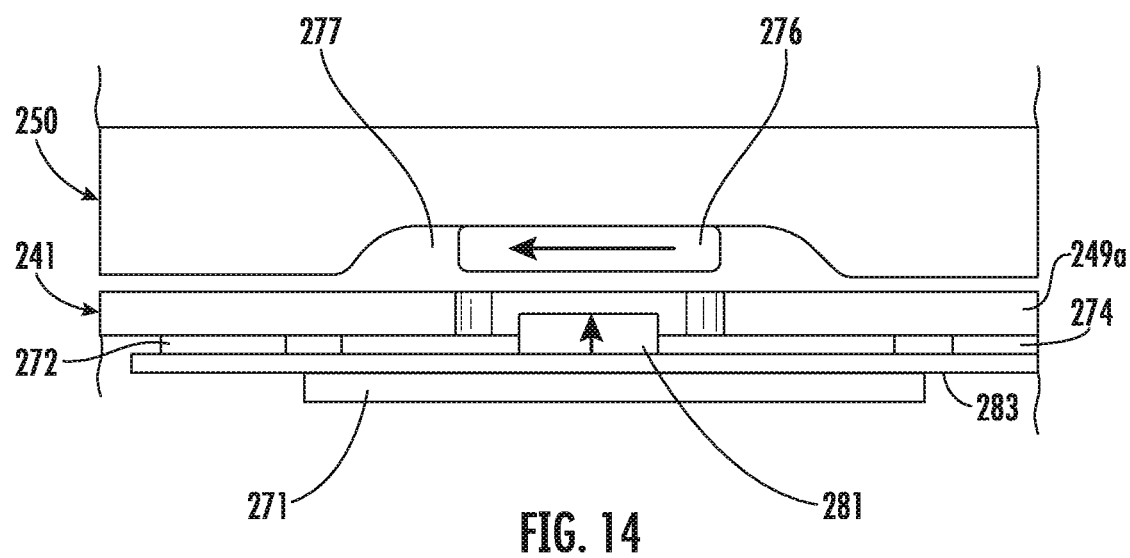
FIG. 14 is a schematic top view of a portion of the haptic actuator of FIG. 13.

Referring now to FIGS. 13 and 14, in another embodiment, the elongate housing 241 includes a "tub" housing 249a rather than discrete frame segments that couples to a bottom plate 249c. The label cover 249e is carried by the top or cover portion of the housing 249a. Additionally, a stiffener 271, for example a ferritic stiffener, may be carried by a flexible circuit substrate 283, which may be coupled to adjacent portions of the housing 249a by way of a pressure sensitive adhesive layer 272 and a heat activated film adhesive 274, for example. The stiffener 271 may carry the Hall effect sensor 281, as described above, for example, to measure fields in the direction normal to the path of travels and pointing toward the magnet. The stiffener 271 may provide magnetic shielding from outside aggressor fields and may improve mechanical robustness of the Hall effect sensor 281. A thermistor 275 may also be carried by the flexible circuit substrate 283 and be coupled to a controller for temperature based operation of the haptic actuator, for example, based upon coil temperature. A recess or channel 266 is within the stator 246, and more particularly, the core 247, and the field member 250 to permit wiring from the coils 244, 245 and the thermistor 275 to pass through.

Additionally, a sense magnet 276 is illustratively carried by the field member 250 in a recess 277. The sense magnet 276 is polarized in the elongated direction of the field member 250 or haptic actuator 240. The sense magnet 276 may be used in conjunction with the Hall effect sensor 281 to determine a position of the field member 250. Of course, the sense magnet 276 may be used for other and/or additional functions.

Elements illustrated but not specifically described are similar to those described above, for example, the ferritic bodies 268a, 268b, the brackets 249g, 249h, the mechanical stops 273, the flexures 260 including the two diverging arms 262a, 262b and bend 278, and anchor members 279a, 279b.

Figure 15:
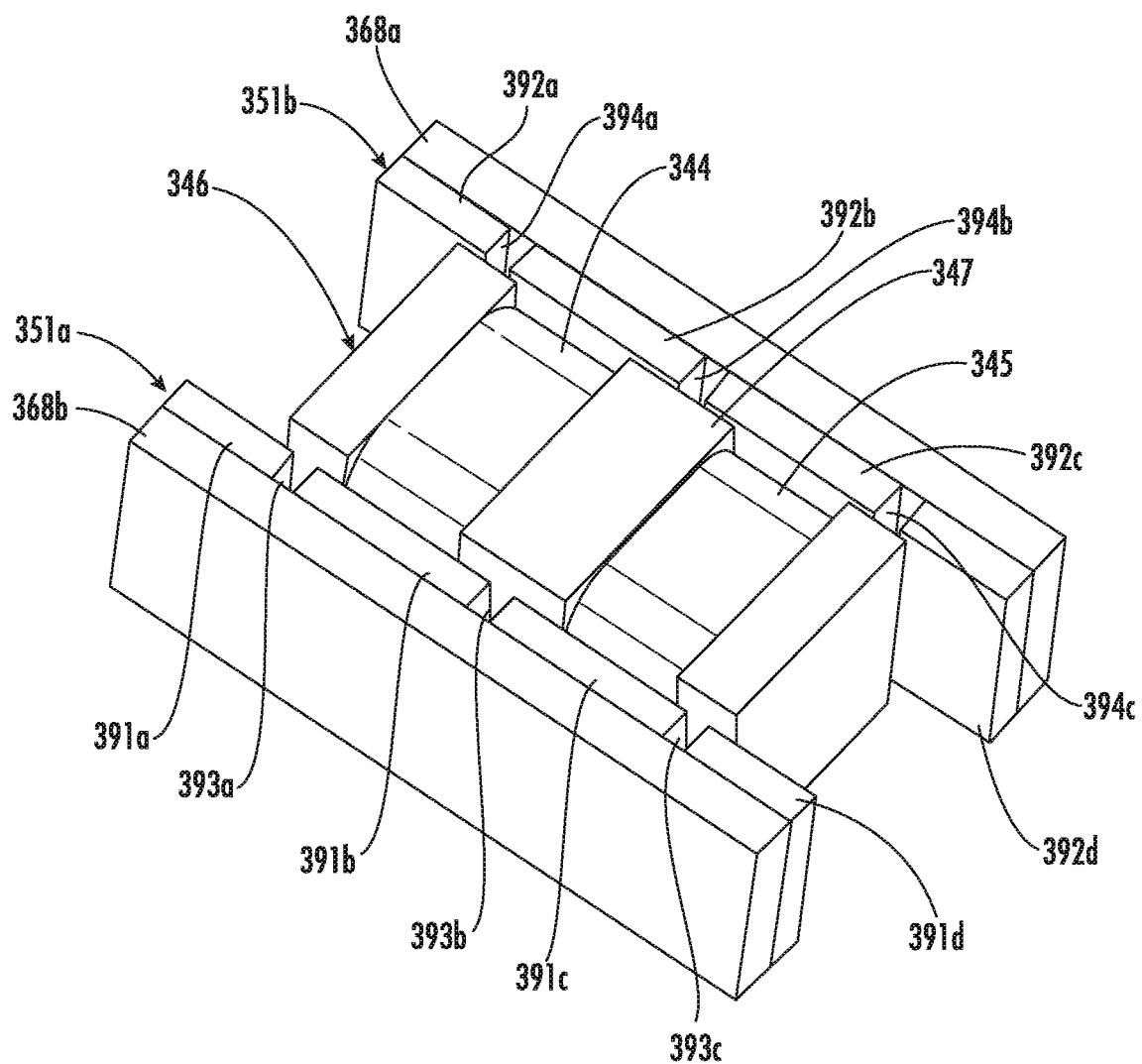
FIG. 15 is a schematic diagram of a portion of a haptic actuator in accordance with another embodiment.
Figure 16:
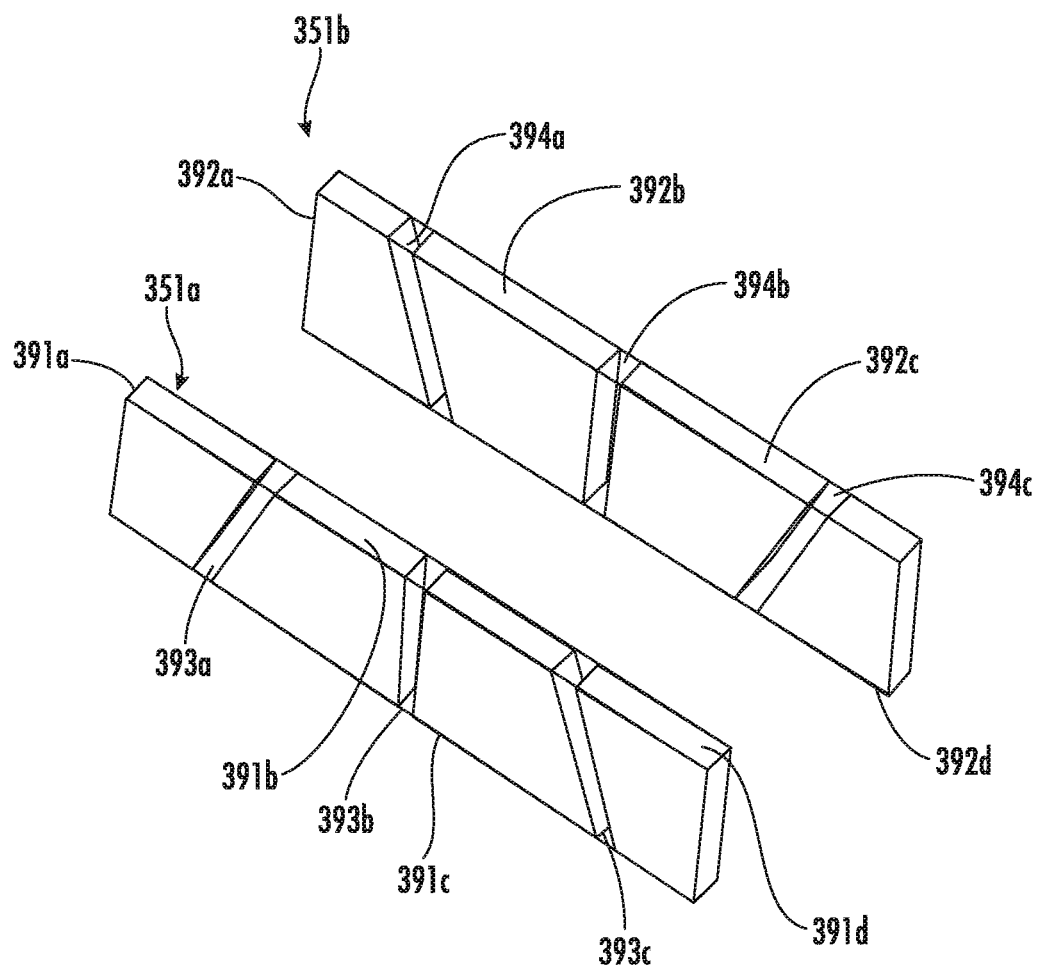
FIG. 16 is a schematic diagram of the permanent magnets of the haptic actuator of FIG. 15.

Referring now to FIGS. 15 and 16, in an embodiment, the permanent magnets 351a, 351b, which are, similar to the embodiments described above, on first and second opposing sides of the opening in the field member, each have side-by-side magnetic segments 391a-391d, 392a-392d having alternating magnetic polarizations. The side-by-side magnetic segments 391a-391d of the first permanent magnet 351a have opposite polarizations with respect to the side-by-side magnetic segments 392a-392d of the second permanent magnet 351b.

The magnetic polarization transition zone 393a between the first and second adjacent segments 391a, 391b of the first permanent magnet 351a is non-vertical. While an angle from normal to a surface of the first permanent magnet 351a is illustrated, those skilled in the art will appreciate that the non-vertical angle may be any angle, for example, from three degrees from normal, and more particularly, from three degrees to twenty degrees from normal, such as seventeen degrees. The magnetic polarization transition zone 393b between the second and third adjacent segments 391b, 391c of the first permanent magnet 351a is vertical so that the first and second magnetic segments 391a, 391b each has a trapezoidal shape. The magnetic polarization transition zone 393c between the third and fourth adjacent segments 391c, 391d of the first permanent magnet 351a is also non-vertical so that the third and fourth magnetic segments each also has a trapezoidal shape. Of course, the magnetic transition zones 393a-393c can vary between vertical and non-vertical. The arrangement of the polarization transition zones 394a-394c between the magnetic segments 392a-392d of the second permanent magnet are illustratively matched with respect to non-vertical and vertical, however, in some embodiments, the non-vertical angles from normal need not match or may be different.

While the transition zones 393a-393c, 394a-394c are illustratively linear, the transition zones may be curved. The non-vertical magnetic polarization transition zones 393a-393c, 394a-394c may create forces in axes other than an axis of the desired direction of travel. For example, while in most cases, the magnetic polarization transition zones 393a-393c, 394a-394c may each have independent shapes, it may be particularly desirable to have the magnetic polarization transition zones on opposing sides (i.e., of the stator 346) cancel or reduce the forces on other axes.

A method aspect is directed to a method of making a haptic actuator 340. The method includes mounting a stator 346 to a medial interior portion of a housing 341. The method also includes mounting a field member 350, including a frame 357 and at least one permanent magnet 351a, 351b carried by the frame, within the housing 341 so that the stator 346 is received within an opening 355 in the field member. The at least one permanent magnet 351a, 351b includes a plurality of side-by-side magnetic segments 391a-391d, 392a-392d having alternating magnetic polarizations with at least one non-vertical magnetic polarization transition zone 393a-393c, 394a-394c between adjacent magnetic segments.

Figure 17:
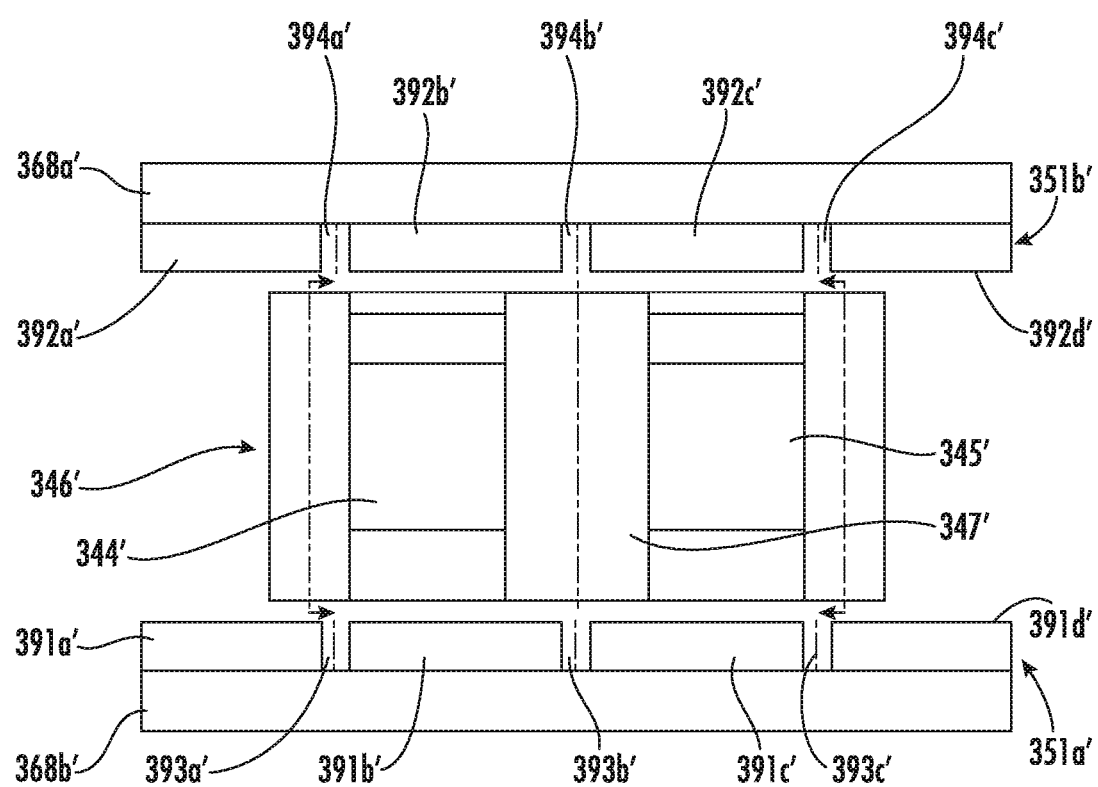
FIG. 17 is a schematic diagram of a haptic actuator in accordance with another embodiment.

Referring now to FIG. 17, in another embodiment, the magnetic polarization transition zones 393a'-393c', 394a'-394c' between adjacent magnetic segments 391a'-391d', 392a'-392d' are illustratively offset relative to the pole center. For example, the magnetic polarization transition zones 393a'-393c', 394a'-394c' may be offset by a quarter of a pole width. Of course, the offset may be different widths. While in most embodiments, the offsets of each magnetic polarization transition zone 393a'-393c', 394a'-394c' may be independently adjusted or modified, however, it may be desirable have offsets that are symmetrical to reduce or avoid any asymmetry in the force characteristics.

While several embodiments have been described herein, it should be appreciated by those skilled in the art that any element or elements from one or more embodiments may be used with any other element or elements from any other embodiment or embodiments. Many modifications and other That which is claimed is:

1. A haptic actuator comprising:
a housing;
a stator coupled to a medial interior portion of the housing; and
a field member movable within the housing and having an opening receiving the stator therein, the field member comprising a frame and at least one permanent magnet carried by the frame;
the at least one permanent magnet comprising a plurality of side-by-side magnetic segments having alternating magnetic polarizations with at least one non-vertical magnetic polarization transition zone between adjacent magnetic segments.

2. The haptic actuator of claim 1 wherein the at least one non-vertical magnetic polarization transition zone has an angle of at least three degrees from normal to a surface of the at least one permanent magnet.

3. The haptic actuator of claim 1 wherein the plurality of side-by-side magnetic segments has at least one vertical magnetic polarization transition zone between adjacent magnetic segments.

4. The haptic actuator of claim 1 wherein the at least one permanent magnet comprises a first permanent magnet on a first side of the opening and a second permanent magnet on a second side of the opening opposite the first side of the opening.

5. The haptic actuator of claim 4 wherein the plurality of side-by-side magnetic segments of the first permanent magnet have opposite magnetic polarizations with respect to the plurality of side-by-side magnetic segments of the second permanent magnet.

6. The haptic actuator of claim 1 wherein at least one of the plurality of side-by-side magnetic segments has a trapezoidal shape.

7. The haptic actuator of claim 1, wherein the housing is an elongate housing, and the haptic actuator further comprising at least one flexure coupled between an end of the frame and adjacent interior portions of the elongate housing to permit reciprocal movement of the field member within the elongate housing responsive to the stator.

8. The haptic actuator of claim 1 wherein the stator comprises a core and a plurality of serially coupled coils surrounding the core.

9. The haptic actuator of claim 8 wherein the core has a plurality of openings therein to expose a plurality of cavities having a larger size than a corresponding opening; and wherein the plurality of serially coupled coils are carried within the plurality of cavities.

10. The haptic actuator of claim 9 wherein at least one of the plurality of openings is offset from a center of a corresponding one of the plurality of cavities.

11. The haptic actuator of claim 1 wherein the stator has at least one opening therein offset from an adjacent magnetic polarization transition zone between adjacent magnetic segments.

12. An electronic device comprising:
a device housing;
wireless communications circuitry carried by the device housing;
a haptic actuator comprising
an actuator housing,
a stator coupled to a medial interior portion of the actuator housing, and
a field member movable within the actuator housing and having an opening receiving the stator therein, the field member comprising a frame and at least one permanent magnet carried by the frame,
the at least one permanent magnet comprising a plurality of side-by-side magnetic segments having alternating magnetic polarizations with at least one non-vertical magnetic polarization transition zone between adjacent magnetic segments; and
a controller configured to perform a wireless communications function in cooperation with the wireless communications circuitry and selectively operate the haptic actuator.

13. The electronic device of claim 12 wherein the at least one non-vertical magnetic polarization transition zone has an angle of at least three degrees from normal to a surface of the at least one permanent magnet.

14. The electronic device of claim 12 wherein the plurality of side-by-side magnetic segments has at least one vertical magnetic polarization transition zone between adjacent magnetic segments.

15. The electronic device of claim 12 wherein the at least one permanent magnet comprises a first permanent magnet on a first side of the opening and a second permanent magnet on a second side of the opening opposite the first side of the opening.

16. The electronic device of claim 15 wherein the plurality of side-by-side magnetic segments of the first permanent magnet have opposite magnetic polarizations with respect to the plurality of side-by-side magnetic segments of the second permanent magnet.

17. The electronic device of claim 12 wherein at least one of the plurality of side-by-side magnetic segments has a trapezoidal shape.

18. A method of making a haptic actuator comprising:
mounting a stator to a medial interior portion of a housing; and
mounting a field member, comprising a frame and at least one permanent magnet carried by the frame, within the housing so that the stator is received within an opening in the field member, the at least one permanent magnet comprising a plurality of side-by-side magnetic segments having alternating magnetic polarizations with at least one non-vertical magnetic polarization transition zone between adjacent magnetic segments.

19. The method of claim 18 wherein the at least one non-vertical magnetic polarization transition zone has an angle of at least three degrees from normal to a surface of the at least one permanent magnet.

20. The method of claim 18 wherein the plurality of side-by-side magnetic segments has at least one vertical magnetic polarization transition zone between adjacent magnetic segments.

21. The method of claim 18 wherein the at least one permanent magnet comprises a first permanent magnet on a first side of the opening and a second permanent magnet on a second side of the opening opposite the first side of the opening.

22. The method of claim 21 wherein the plurality of side-by-side magnetic segments of the first permanent magnet have opposite magnetic polarizations with respect to the plurality of side-by-side magnetic segments of the second permanent magnet.

23. The method of claim 18 wherein at least one of the plurality of side-by-side magnetic segments has a trapezoidal shape.

\* \* \* \* \*